(12) United States Patent
Kraus (10) Patent No.: US 11,514,675 B2
(45) Date of Patent: Nov. 29, 2022

(54) IMAGE-BASED SOIL CHARACTERISTIC MAPPING

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/164,264

(22) Filed: Feb. 1, 2021

(65) Prior Publication Data

US 2022/0245383 A1 Aug. 4, 2022

(51) Int. Cl.
*G06V 20/00* (2022.01)
*G06K 9/00* (2022.01)
*G06T 7/55* (2017.01)

(52) U.S. Cl.
CPC ......... *G06V 20/38* (2022.01); *G06K 9/00536* (2013.01); *G06T 7/55* (2017.01); *G06T 2207/30188* (2013.01)

(58) Field of Classification Search
CPC ...... G06V 20/38; G06K 9/00536; G06T 7/55; G06T 2207/30188
See application file for complete search history.

(56) References Cited

U.S. PATENT DOCUMENTS

| 7,725,233 B2 | 5/2010 | Hendrickson et al. |
| 10,175,362 B2 | 1/2019 | Redden et al. |
| 10,491,879 B2 | 11/2019 | Redden |
| 2015/0310633 A1* | 10/2015 | Nelan ................... G06T 7/0002 382/110 |
| 2017/0228118 A1* | 8/2017 | Sugumaran ........... G06T 7/0004 |
| 2018/0257657 A1 | 9/2018 | Blank et al. |
| 2018/0330166 A1 | 11/2018 | Redden et al. |

FOREIGN PATENT DOCUMENTS

CN 109478232 A * 3/2019 ........... G06K 9/4652

OTHER PUBLICATIONS

Hill, S.B. and Ramsay, J., 1977. Weeds as indicators of soil conditions. The McDonald Journal, 38(6), pp. 8-12.*
Deere & Company, Utility U.S. Appl. No. 16/897,997, filed Jun. 10, 2020. (40 pages).

(Continued)

*Primary Examiner* — Zhitong Chen
(74) *Attorney, Agent, or Firm* — Klintworth & Rozenblat IP LLP (57) ABSTRACT

Embodiments of a soil mapping process include the step or process of receiving georeferenced field images of vegetation within an imaged crop field, the georeferenced field images transmitted from a field imaging source to an image-based soil mapping system. The image-based soil mapping system visually analyzes the georeferenced field images to identify and categorize non-crop vegetation distributions present within the imaged crop field; compiles a soil characteristic map for the imaged crop field based, at least in part, on a comparison between the non-crop vegetation distributions and data stored in a first database correlating different categories of non-crop vegetation with variations in one or more soil characteristics; and then provides the soil characteristic map for user viewing on a display device.

19 Claims, 4 Drawing Sheets

(56) References Cited

OTHER PUBLICATIONS

Sweetser, Robin, What Weeds Tell You About Your Soil, The Old Farmer's Almanac, May 13, 2020. (18 pages).
Blue River Technology, Our See & Spray Machines, smartmachines bluerivertechnology.com, copyright 2015-2018. (13 pages).
Growing Guides, Weeds as Soil Indicators, https://growing-guides.co.uk/weeds-as-soil-indicators/, undated, admitted prior art. (11 pages).
Iowa State University, Corn Diagnostic Guide—Emergence to 8-10 Leaves, Hancock County, copyright 2021. (4 pages).
Homestead, Using Weeds as Soil Indicators on the Homestead, https://www.homestead.org/, copyright 1997-2021. (7 pages).

* cited by examiner

IMAGE-BASED SOIL CHARACTERISTIC MAPPING

CROSS-REFERENCE TO RELATED APPLICATION(S)

Not applicable.

Statement of Federally Sponsored Research or Development

Not applicable.

FIELD OF THE DISCLOSURE

This disclosure relates to systems and methods for compiling soil characteristic maps based upon non-crop vegetation distributions identified through visual analysis of crop field imagery.

BACKGROUND OF THE DISCLOSURE

Soil characteristic maps are utilized to plot soil characteristics or traits (e.g., soil compaction, fertility levels, moisture content, nutrient levels, pH levels, or the like) as such characteristic vary geographically across the area of a crop field, typically as seen from a planform or top-down (aerial) perspective. An accurate soil characteristic map can provide a highly useful analytical tool in developing precision agriculture strategies and best practices addressing suboptimal soil conditions that, if left unaddressed, may otherwise hinder crop growth and yield. Such agriculture strategies can include the targeted application of soil amendments (e.g., fertilizer and organic nutrient sources), alterations to current (e.g., chemical) treatment practices, fine-tuning of mechanical processing (e.g., tillage) practices, and the installation (or modification) of field tiling to assist with drainage or moisture retention, to list but a few examples. Given these benefits, crop producers commonly invest appreciable financial resources in hiring third party services to travel to an agricultural area; extract dozens, if not hundreds of physical soil samples from sample sites across one or more crop fields; conduct on-site or lab analysis of the collected soil samples; and ultimately compile one or more soil characteristic maps of the sampled crop field for future reference in rendering soil treatment decisions.

SUMMARY OF THE DISCLOSURE

Processes are disclosed for compiling soil characteristic maps utilizing non-crop vegetation or plant distributions identified through visual analysis of crop field imagery. In embodiments, the soil mapping process includes the step or process of receiving, at an image-based soil mapping system, georeferenced field images of vegetation within an imaged crop field. The georeferenced field images are transmitted from a field imaging source to the image-based soil mapping system. The image-based soil mapping system visually analyzes the georeferenced field images to identify and categorize non-crop vegetation distributions present within the imaged crop field; and compiles a soil characteristic map for the imaged crop field based, at least in part, on a comparison between the non-crop vegetation distributions and data stored in a first database, which correlates different categories of non-crop vegetation with variations in one or more soil characteristics. The image-based soil mapping system then provides the soil characteristic map for user viewing on a display device.

Embodiments of an image-based soil mapping system are further disclosed for carrying-out soil mapping processes. In an example implementation, the image-based soil mapping system includes an input/output (I/O) interface; a memory containing a first database in which data is stored correlating different categories of non-crop vegetation with variations in one or more soil characteristics; and a processor architecture coupled to the I/O interface and to the memory. The processor architecture is configured to: (i) receive georeferenced field images of vegetation within an imaged crop field, the georeferenced field images transmitted from a field imaging source to the controller architecture via the I/O interface; (ii) visually analyze the georeferenced field images to identify and categorize non-crop vegetation distributions present within the imaged crop field; (iii) compile a soil characteristic map for the imaged crop field based, at least in part, on a comparison between the non-crop vegetation distributions and data stored in the first database correlating different categories of non-crop vegetation with variations in one or more soil characteristics; and (iv) enable user viewing of the soil characteristic map on a display device.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed briefly above, it is common for modern crop producers to invest significant financial resources in hiring third parties to compile soil characteristic maps, which plot variations in one or more of soil characteristics over the area of a crop field. Generally, the expense and time investment in compiling soil characteristic maps are tied directly to the conventional practice of collecting physical soil samples from a relatively large number of sample sites spatially distributed across a crop field and subsequently conducting on-site or lab analysis of the soil samples. In one traditional approach, unique soil samples are gathered from each cell of a rectilinear grid, which is utilized to divide the sampled crop field into multiple sections or grid cells. Utilizing a soil sample grid containing grid cells of a smaller size generally yields a soil characteristic map having a higher resolution, with the inexorable tradeoff of added cost and time expenditures. Conversely, utilizing a soil sample grid comprised of larger grid cells tends to minimize cost and boost efficiency, while reducing the resolution of the resulting soil characteristic map. To balance these competing concerns, soil sample grids are commonly constructed from grid cells each having a height and width ranging between two and four acres, which tends to yield a soil characteristic map having adequate resolution, while establishing a reasonable limit on the total number of soil sample sites across a given crop field spanning, for example, a few hundred square acres. However, even in this latter case, the cost and time expenditure required to construct a given soil characteristic map can be significant for larger crop producers and may well be prohibitive for smaller crop producers. Further, even in the context of larger, well-resourced crop producers, soil characteristic maps are often generated at relatively infrequent intervals due to cost and inconvenience, which reduces the usefulness as previously-compiled maps become outdated.

An ongoing industry demand thus exits for systems and methods by which accurate soil characteristic maps can be generated in a cost-efficient and streamlined manner. In satisfaction of this industrial demand, the following discloses soil mapping processes carried-out by a processing system, herein an "image-based soil mapping system." The image-based soil mapping system constructs soil characteristic maps as a function of (that is, based at least in part on) non-crop vegetation distributions or plant populations identified through visual analysis of crop field imagery, with the term "crop field imagery" referring to imagery (still images or extracted video frames) captured of one or more crop fields. The non-crop vegetation distributions can be composed of any number and type of plants (colloquially, "weeds") in addition to plant species or types intentionally grown in a given crop field, farmstead, or agricultural area. Embodiments of the image-based soil mapping system receive georeferenced field images of vegetation present within an imaged crop field from a field imaging source. As indicated by the term "georeferenced," each field image obtained from the field imaging source may be tagged (associated with data) correlating the image with the particular geographical location at which the image is captured, or may otherwise contain sufficient information permitting the location of the image to be established in a geographical context. Embodiments of the present disclosure may be particularly useful in constructing soil characteristic maps of fields utilized to grow forage crops or "forages," including grasses, clover, alfalfa, legumes, maize, and other crop residues; however, the below-described image-based soil mapping process can be conducted to create soil characteristic maps for crop fields utilized to grow any crop or plant species (monoculture) or combination of plant species without limitation, providing that any non-crop plant distributions or populations are adequately visible in the captured crop field imagery to carrying-out the below described visual analysis processes identifying such non-crop distributions.

The field imaging source can include any number of camera-equipped devices, machines, vehicles, or platforms capable of capturing images of a crop field suitable for usage in identifying distributions of non-crop vegetation or plant species within a visually-sampled or imaged crop field, whether such images are captured in the visible, the ultra-violet, or another portion of the electromagnetic (EM) spectrum. In many instances, the field images may be obtained by one or more low altitude (e.g., rotorcraft) drones utilized to capture aerial images of a crop field, while flying over the crop field in, for example, a sweeping pattern or other pattern providing adequate coverage of the field area. Images of a visually-sampled crop field can also be captured utilizing a camera-equipped satellite or high altitude (e.g., fixed wing or lighter-than-air) drones for larger operations; or, perhaps, utilizing cameras mounted to agricultural implements or vehicles, such as tractors, combines, windrowers, or self-propelled sprayers, when traveling through a crop field. In still other instances, the crop field imagery may be captured utilizing cameras perched at elevated fixed-mount positions, with such cameras remaining static or potentially capable of moving (e.g., rotating) to permit monitoring of a greater area. For example, in this latter regard, a camera having a field-of-view (FOV) encompassing regions of a crop field, and possibly providing a wide angle or 360 degree FOV, can be mounted positioned atop an elevated natural structure or geographical feature, such as a hill; mounted to a tethered aerial platform; or, more commonly, may be mounted to a relatively lofty man-made structure, such as a silo, a windmill or wind turbine, tall signage, or a utility pole, to list but a few examples.

Following reception of the field images, the soil mapping system visually analyzes the georeferenced field images to identify and categorize non-crop vegetation distributions or plant populations present within the imaged crop field or fields. For example, in implementation in which one or more forage crops are desirably grown in an imaged crop field, the soil mapping system may identify and categorize geographical distributions of any plants present within the imaged crop field other than (or in addition to) the desired forage crop or crops. In this case, the desired forage crop or crops may be determined based upon operator input received at an interface of the image-based soil mapping system. The soil mapping system may identify non-crop vegetation distributions utilizing different image analysis techniques, including utilizing a neural network trained to visually recognize and categorize a wide range of plant species. In certain embodiments, various techniques may further be applied to reduce processing loads or demands, such as by excluding unlikely plant species candidates from the visual plant classification or categorization search; e.g., by limiting image analysis performed the image-based soil mapping system to only those non-crop vegetation categories generally found within the geographical region in which the imaged crop field is located or based on seasonal considerations. In many instances, the soil mapping system may be provided as a cloud-based service with which crop producers interface utilizing network-connected devices to initiate the creation of, and to download or otherwise view, soil characteristics maps. In other instances, however, the soil mapping system may be deployed locally at the site of a crop producer; e.g., by executing a software program downloaded to a personal computer, a tablet, a smartphone, or another network-connected device operated by a crop producer.

After analyzing the relevant crop field images to identify any visually-detected non-crop plant populations or vegetation distributions within the imaged field area, the soil mapping system compiles at least one soil characteristic map for the imaged crop field. The soil characteristic map is compiled or constructed based, at least in part, on a comparison between the non-crop vegetation distributions and reference data stored in a first database correlating different categories of non-crop vegetation with variations in one or more soil characteristics. Such a database may be maintained by the soil mapping system (e.g., when provided as a cloud-based service) or may otherwise be availed to the soil mapping system in some manner. The database retains reference information correlating various types of non-crop vegetation or plants with variations in soil traits or characteristics stored utilizing multi-dimensional look-up tables or similar data structures. The soil mapping system then utilizes any non-crop vegetation distributions, as identified in the field images, to infer or deduce the soil characteristic(s) desirably subject to mapping, taken in conjunction with any other relevant data including, for example, the soil conditions supporting the desirably-grown crop species. Such soil characteristics can include, but are not limited to, soil fertility levels, soil moisture levels, pH levels, chemical toxicity levels, soil nutrient levels, soil composition types, compaction levels, and potentially other traits or characteristics, such as aeration concentrations or the degree to which microorganisms are present within the soil. Any or all such soil characteristics can then be expressed as a soil characteristic map, which visually conveys the levels and variations of the mapped soil characteristics through color coding or in any other suitable manner.

In the above-described manner, a soil characteristic map can be generated effectively leveraging existing non-crop plant populations, such as a non-crop plant species commonly identified as "weeds," effectively as biological sensors or markers denoting usefully-known soil traits of localized areas spread across a crop field. Further, the usage of such imagery to identify such non-crop plant populations (vegetation distributions) enables the visual sampling of large swaths or expansive geographical regions of a crop field in a highly efficient manner. Neural networks and similar visual recognition algorithms are further capable of rapidly and accurately identifying many non-crop plant types (including flowering plants and dandelion populations) from such imagery; and camera-equipped aerial drones (e.g., autonomous or remotely-piloted rotorcraft) are further well-suited for creating a georeferenced aerial map of crop fields in an efficient, accurate, and reliable manner. The convergence of such technologies can consequently enable the rapid and cost-effective compilation of soil characteristic maps based upon non-crop vegetation distributions detected within crop field images, as noted briefly above and discussed more fully below. Further, other pertinent data, if available, may also be considered in compiling soil characteristic maps in embodiments. For example, historical information regarding previous soil characteristic maps or physical soil samples can also be considered and blended with the image-based analysis to further refine the soil characteristic maps, as desired. Finally, such a soil characteristic mapping techniques are conveniently availed as a service in embodiments, in which case the service may deploy or cause the deployment of drones (or other camera-equipped vehicles or devices) to a specified agricultural area at the behest of a sure (crop grower), collect the requisite crop field imagery, utilize the field imagery to compile an image-based soil characteristic map, and then provide the map to an end user (crop grower) for their usage.

In at least some embodiments, the soil mapping system may also provide soil treatment recommendations for maximizing the production of the desired crop species as determined utilizing the newly-constructed soil characteristic map or maps, possibly in combination with other information. For example, in such embodiments, the soil mapping system may access a second database or dataset correlating optimal soil characteristics with different categories of forage crops, which, as noted above, can include various grasses, clover, alfalfa, legumes, maize, and other crop residues. The soil mapping system may then determine localized (area-specific) soil modification recommendations for maximizing production of the one or more desired forage crops based, at least in part, on a comparison between the soil characteristic map and the data stored in the second database. The soil mapping system avails the localized soil modification recommendations for user viewing on a display device; e.g., by transmitting or allowing download of the soil treatment recommendations to a user device (e.g., a tablet, a personal computer, a smartphone, or another device operated by a crop producer) over a communications network. Such localized soil modification recommendations can pertain to soil amendment recommendations (e.g., suggestions pertaining to the type and quantity of nutrients to add to specific regions of a crop field or to adjust pH level), recommendations to tillage, and recommendations to addition of tiling or other drainage modifications.

Example embodiments of an image-based soil characteristic mapping system, as potentially included in networked device architecture, are discussed below in connection with FIG. 1. Following this, examples of image-based soil characteristic mapping process, as suitably carried-out by the image-based mapping system, are described in connection with FIG. 2. An example of a subprocess potentially performed in concert with the image-based soil characteristic mapping process is further set-forth below in conjunction with FIG. 3. A signal timing diagram illustrating an example manner in which different devices or entities may communicate when initiating, carrying-out, and completing image-based soil characteristic mapping process is discussed in connection with FIG. 4. Lastly, there is set-forth an example scenario is which an end user (e.g., crop producers) interacts with an image-based soil mapping service (e.g., over a network connection) to bring about imaging of specified crop fields (in this example, utilizing one or more dispatched drones) and the subsequent generation of one or more soil characteristic maps. While useful in presenting certain permutations or potential realizations of the present teachings, the following description should be understood as merely providing a non-limiting example context in which embodiments of the present disclosure may be better understood.

Example Systems and Methods for Compiling Image-Based Soil Characteristic Maps

Figure 1:
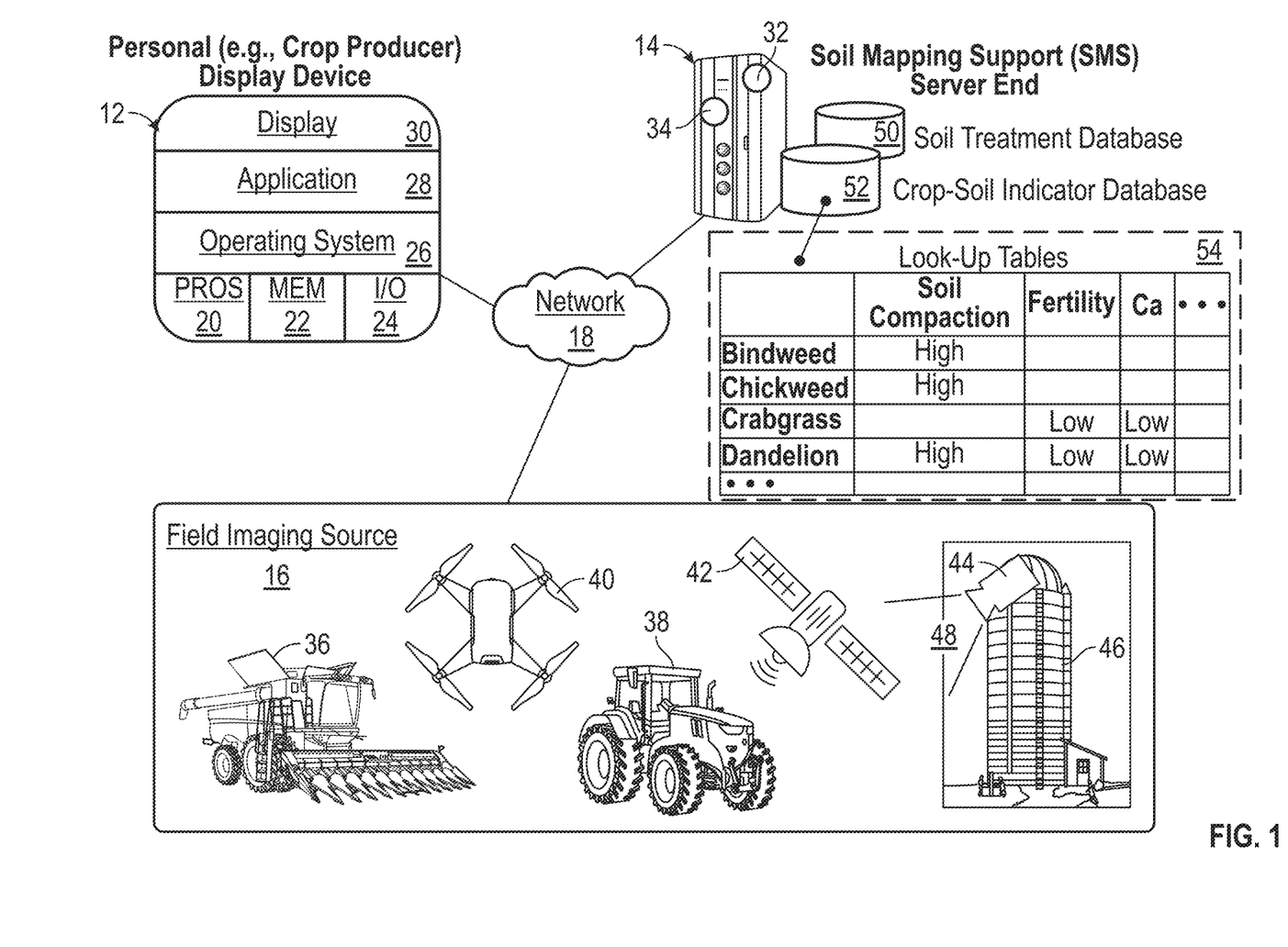
FIG. 1 illustrates an example networked device architecture including multiple computing devices and a field imaging source in communication over a network, with at least one of the illustrated computing devices serving as an image-based soil mapping system in embodiments.

Turning now to the drawings and with initial reference to FIG. 1, there is shown an example networked device architecture 10 suitable for carrying-out embodiments of the present disclosure. The networked device architecture 10 includes at least one personal display device 12, a soil mapping support (SMS) server end 14, and a field imaging source 16. The personal display device 12, the SMS server end 14, and the field imaging source 16 are capable of communication over a network 18, which may include or assume the form of the Internet. Additionally, in certain embodiments, the personal display device 12, the SMS server end 14, and/or the field imaging source 16 may be capable of direct communication over, for example, a short range, wireless peer-to-peer connection or a wired connection. For example, in embodiments in which the field imaging source 16 includes at least one camera-equipped drone 40 (discussed below), the drones 40 may be capable of communicating directly with the SMS server end 14 or the personal display device 12 over a short range, peer-to-peer connection when brought into sufficient proximity of the relevant device; over a physical data connection; or instead through transfer of a removable storage device (e.g., a flash memory drive) onto which the below-described field images (captured as still pictures or a video file) are stored. The components or nodes of the example networked device architecture 10 are each described, in turn, below.

Addressing first the personal display device 12, the example personal display device 12 contains a processor architecture 20 (e.g., one or more processors), a computer-readable memory 22, and any number of input/output (I/O) features 24. An operating system (OS) 26, as defined by computer-readable code or instructions residing in the memory 22, is executed by the processor architecture 20 during operation of the personal display device 12. In embodiments, and as indicated in FIG. 1, the OS 26 may support operation of a software application 28, which can be loaded onto the personal display device 12 to carry-out the below-described functions including presentation of the below-described soil characteristic maps on a display 30 for viewing by an operator or user of the display device 12. In other embodiments, a given user (e.g., a crop producer) may utilize the personal display device 12 to launch a plugin program or applet via a conventional web browser to carry-out one or more of the functions described herein, such as to support data entry initiating an image-based soil mapping process ultimately conducted by an entity or service operating the SMS server end 14. In this regard, the personal display device 12 may be a portable electronic device readily carried on a user's person, such as a smartphone, a wearable device, or a tablet. Alternatively, the personal display device 12 may be an electronic device of the type commonly located in a person's home, office, or the like, such as a laptop or desktop computer. In embodiments, the display 30 may be integrated into the personal display device 12 as a unitary system or electronic device when the user device 12 assumes the form of a mobile phone, tablet, laptop computer, or similar electronic device having a dedicated display screen. In other instances, the display 30 can assume the form of an independent device, such as a freestanding monitor or television set, which is connected to the personal display device 12 via a wired or wireless connection.

Discussing next the SMS server end 14, the term "server end" is utilized herein to refer to one or more servers in communication with other network-connected devices (here, including the personal display device 12) over a network, such as the illustrated network 18. The SMS server end 14 can be implemented utilizing a cloud computing (distributed server) architecture, as a localized server farm, or as a single server in embodiments. Whether implemented utilizing a distributed server architecture, a localized server or server farm operating on the Internet, or in some other manner, SMS server end 14 provides certain services or computer-based functions supporting the below-described image-based soil characteristic mapping processes. Accordingly, the SMS server end 14 may likewise include a processor architecture 32 (e.g., one or more processors) and a memory 34 storing computer-readable instructions or information for carrying-out the processes or functions described herein. In certain cases, the SMS server end 14 may store a neural network algorithm, or a similar machine-learning algorithm, trained to recognize visual patterns within the collected crop field images and identify different crop species based upon various aspects of the phenotype or appearance of different crop species. Additionally, the SMS server end 14 may maintain or otherwise have access to any number of databases 50, 52 holding reference data utilized in converting non-crop vegetation distributions (as identified through visual analysis of crop field imagery) to information pertaining soil characteristics or traits desirably subject to mapping. For example, as schematically shown in FIG. 1 and as further discussed below, the SMS server end 14 may have access to a first database (herein, a "crop-soil indicator database 52") in which information correlating crop categories (e.g., plant species, subspecies, or groups of species) with different associated soil traits or characteristics is stored; e.g., as partially shown in FIG. 1, one or more look-up multi-dimensional lookup tables may be stored correlating such crop categories with variations in one or more soil characteristics, as further discussed in connection with FIG. 2. Additionally, a second database 50 (herein, a "soil treatment database 50") may also be accessible to the SMS server end 14 and store information relating to an array of potential soil treatment options promoting the growth of intended crops, as determined considering current soil conditions indicated by newly-compiled or previously-compiled soil characteristic maps.

Figure 5:
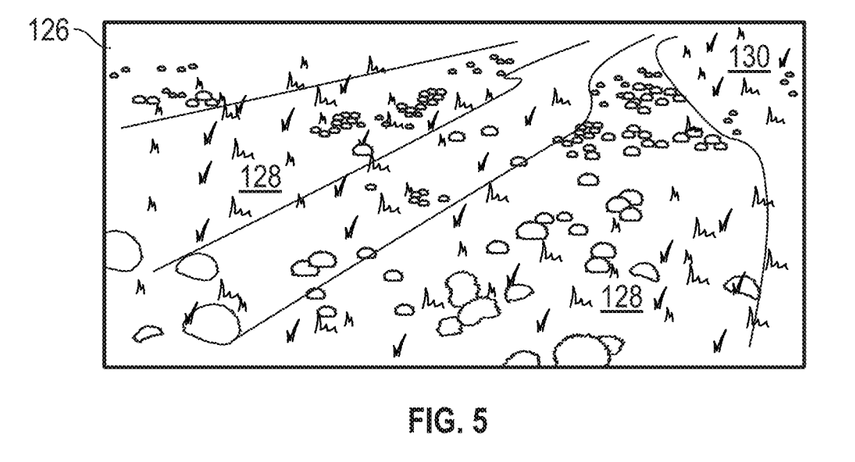
FIG. 5 is a line drawing of a forage crop (e.g., hay) field in which non-crop vegetation (here, dandelion) distributions can be seen, with the forage crop field potentially subject to soil characteristic mapping utilizing the soil characteristic mapping process set-forth in connection with FIG. 2.

As previously indicated, the field imaging source 16 generically shown in FIG. 1 can include any number of camera-equipped devices, machines, or vehicles capable of capturing images of a crop field suitable for usage in identifying distributions of non-crop vegetation within an imaged crop field; and equipped with position-monitoring sensors, such as a Global Positioning System (GPS) module or another satellite-based positioning system, capable of stamping or tagging captured images with georeferenced locations. Further, the crop field images can be captured in the visible portion, the ultraviolet portion, or another portion of the EM spectrum. As a more specific example, the field imaging source 16 can include one or more cameras onboard any number and type of agricultural, GPS-equipped work vehicles 36, 38, with an example combine 36 and an example tractor 38 shown in FIG. 1 by way of non-limiting illustration. Other example agricultural work vehicles potentially equipped with cameras, GPS modules (or other satellite-based positioning systems) and associated components or systems (e.g., telematics gateway modules or "TGMs") can include windrowers and self-propelled sprayers, as well as non-self-propelled, camera-equipped implements (e.g., mower-conditioners, seeders, and tillage implements) towed or otherwise moved utilizing a work vehicle. In other instances, aerial images may be captured utilizing any number of drones 40 or, perhaps, a satellite 42 capable of capturing a single, high resolution image encompassing multiple crop fields. With respect to drone photography or videography, in particular, any combination of fixed wing, rotary wing, or lighter-than-air drones can be employed; however, in many instances, one or more rotary wing drones (e.g., quadcopter drones or other rotorcraft, whether remotely piloted or autonomous in nature) may be dispatched to an agricultural area to fly designated patterns (e.g., sweeping patterns) over the crop field to effectively capture or scan the desired area in a complete or comprehensive manner, as further discussed below in connection with FIGS. 5 and 6.

With continued reference to FIG. 1, the schematically-illustrated network 18 broadly encompasses any number and type of communications networks, systems, or architectures for transmitting data between the various components or nodes of the networked device architecture 10 utilizing any common protocols and signaling schemes. These components or nodes include, most notably, the personal display device 12, the SMS server end 14, and the field imaging source 16. The network 18, then, can include one or more open content delivery networks, Virtual Private Networks (VPNs), the Internet, cellular networks, and various other communications networks implemented in accordance with transmission control protocol/Internet protocol (TCP/IP) architectures or other conventional protocols. In various embodiments, network 18 may further encompass one or more local area networks (LANs), wide area networks (WANs), and similar wireless networks established within a residual, business, or commercial structure. With respect to communication with the camera-equipped device or devices serving as the field imaging source 16, the agricultural work vehicles 36, 38 and/or the camera-equipped drones 40, when utilized, may access the network 18 through a cellular or satellite connection (e.g., through an onboard TGM) in embodiments; e.g., in embodiments, one or more drones 40 may transmit a live video feed of the imaged crop field over the network 18 and to the SMS server end 14 (here, acting as the imaged-based soil mapping system), along with corresponding GSP position data, for consideration in carrying-out the below described processes. Alternatively, the device or devices serving as the field imaging source may store captured georeferenced or positioned-stamped imagery in memory, and then transmit the imagery to the SMS server end 14 (or other computing device serving as the image-based soil mapping system) when returning from the imaged crop field and brought into sufficient range of a WAN, LAN, or other network.

In various implementations, the field imaging source 16 may also include one or more terrestrial cameras 44 mounted at elevated fixed-mount positions, with such cameras remaining static or potentially capable of moving to permit visual monitoring of a more expansive agricultural area. For example, in this latter regard, a camera 44 having a FOV 48 encompassing regions of a crop field, and possibly providing a wide angle or 360 degree FOV, can be mounted atop a lofty man-made structure, such as a silo 46. In this case, the terrestrial camera or cameras 44 may provide a video feed to the personal display device 12 and/or the SMS server end 14 over the network 18 through a suitable wireless (e.g., WiFi or cellular) connection in embodiments. In other instances, the field imaging source 16 can include cameras deployed onboard tethered airborne platforms maintained aloft by powered or unpowered (e.g., autorotating) main rotors. Finally, as a still further possibility, location-stamped images can be captured utilizing a personal display device, such as a smartphone or tablet, having an integrated camera and a GPS module. In certain cases, an operator may carry a personal display device (e.g., a tablet or a phone) to a particular region of a crop field, capture images stamped with location metadata, and then transmit such pictures over the communications network 18 and to the SMS server end 14 to, for example, supplement previously-captured imagery of the crop field. Generally, then, any combination of the above-mentioned field imaging sources can be utilized in isolation or in combination to provide redundancy or additional visual sampling of a particular region of an imaged crop field.

Figure 2:
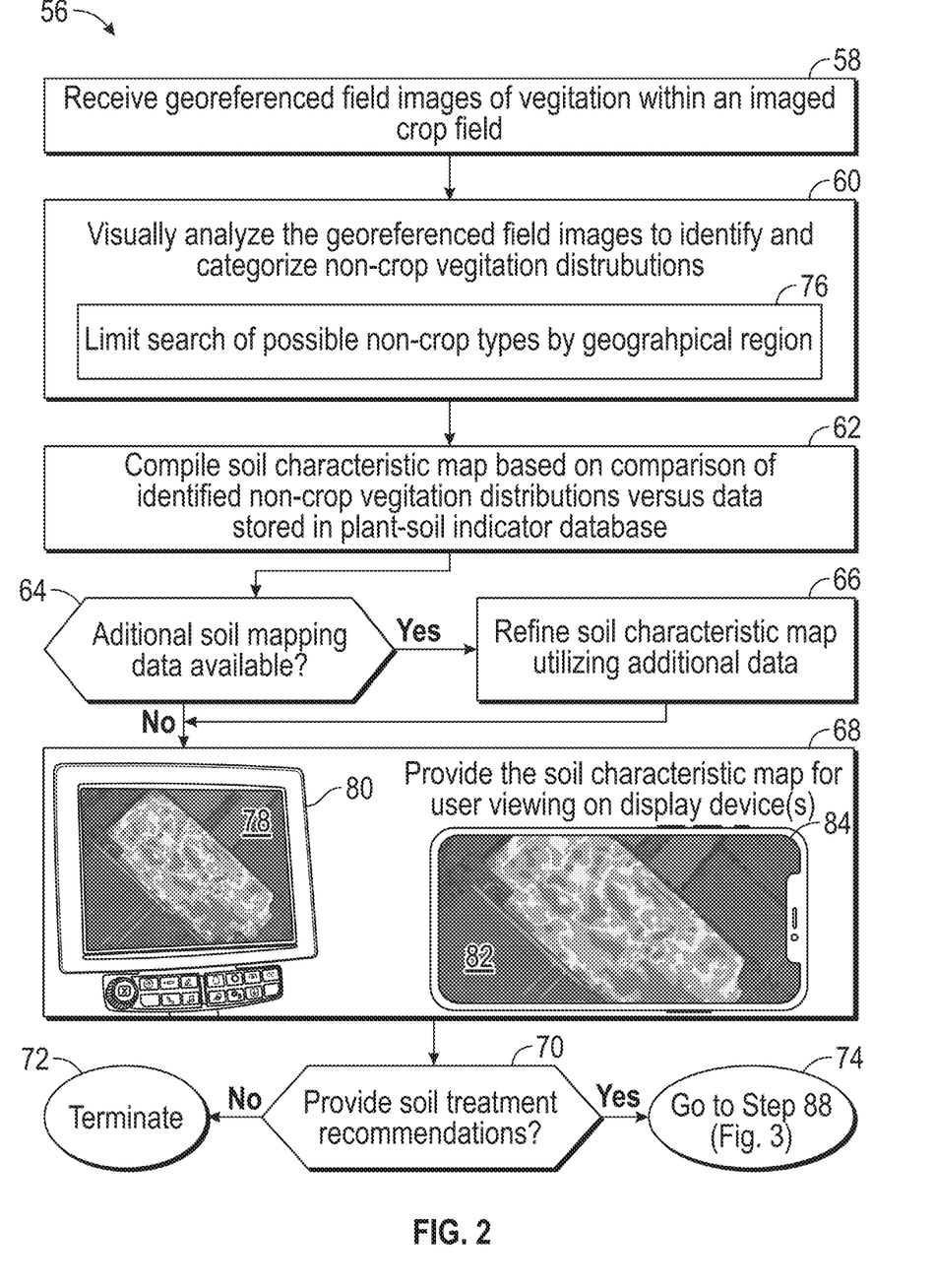
FIG. 2 is a flowchart of an image-based soil characteristic mapping process, which is suitably carried-out by an image-based soil mapping system (e.g., the network-connected server end shown in FIG. 1) and which is illustrated in accordance with an example embodiment of the present disclosure.

Turning now to FIG. 2, an image-based soil characteristic mapping process 56 is set-forth in accordance with an example embodiment of the present disclosure. The image-based soil characteristic mapping process 56 is principally described below as executed by an image-based soil mapping system, such as the SMS server end 14 schematically shown in FIG. 1. This stated, another computing device (e.g., the personal display device 12 shown in FIG. 1) may serve as the image-based soil mapping system and carry-out the example image-based soil characteristic mapping process 56 in alternative embodiments; or, perhaps, various processing steps or tasks involved in carrying-out the image-based soil characteristic mapping process 56 may be apportioned between multiple network-connected processing devices (e.g., both the personal display device 12 and the SMS server end 14 shown in FIG. 1). The soil characteristic mapping process 56 includes a number of process STEPS 58, 60, 62, 64, 66, 68, 70, 72, 74, each of which is described, in turn, below. Depending upon the particular manner in which the soil characteristic mapping process 56 is implemented, each step generically illustrated in FIG. 2 may entail a single process or multiple sub-processes. Further, the steps illustrated in FIG. 2 and described below are provided by way of non-limiting example only. In alternative embodiments of the soil characteristic mapping process 56, additional process steps may be performed, certain steps may be omitted, and/or the illustrated process steps may be performed in alternative sequences.

The soil characteristic mapping process 56 commences at STEP 58 during which georeferenced field images of vegetation or plants within an imaged crop field are received at the image-based soil mapping system (e.g., the SMS server end 14). The georeferenced field images may be transmitted to the SMS server end 14 from the field imaging source 16 over the network 18 in embodiments and may be provided as multiple images; provided as a single image (particularly, if captured by a satellite or a high altitude aircraft and encompassing the entirety of one or more crop fields); provided as a stored video file from which still images or frames can be extracted; or provided as a live video feed when an adequate network connection can be established between the field imaging source 16 and the SMS server end 14 (or other processing device acting as the image-based soil mapping system). The georeferenced field images are each beneficially stamped or tagged with location data, such as GPS coordinates, to assist in construction of the soil characteristic map. It is, however, noted that the location of a particular region of an imaged crop field can also be established in embodiments utilizing image stitching techniques by, for example, recognizing and aligning matching visually distinct features in different images (e.g., frames of a video) having overlapping FOVs. Accordingly, the particular location of a crop field image can be deduced or ascertained based upon location data for other crop field images; and/or based upon previously-established geolocation data of the imaged crop field (e.g., GPS coordinate sets outlining crop field boundaries) in at least some embodiments.

Next, at STEP 60 of the soil characteristic mapping process 56, the image-based soil mapping system visually analyzes the georeferenced field images to identify and categorize non-crop vegetation distributions present within the imaged crop field or fields. For example, in implementation in which one or more forage crops are desirably grown in an imaged crop field, the soil mapping system may identify and categorize geographical distributions of any plants present within the imaged crop field other than (or in addition to) the desired (e.g., forage) crop species. In this case, the desired forage crop species may be determined based upon user or operator input received at an interface of the image-based soil mapping system. The soil mapping system may identify non-crop vegetation distributions utilizing different image analysis techniques, including utilizing a neural network trained to visually recognize and categorize a wide range of plant species. In this regard, a convolutional or other neural network can be trained to recognize leaf shape, stem coloring, flower shape and color (if applicable), and other such phenotypical traits utilized to visually identify different plant species, including non-crop plants or "weeds," which are typically visible in (e.g., aerial) crop field imagery. For example, dandelion (*Taraxacum*) can be readily recognized by, among other features, the presence of yellow flowers in early growth stages and by their distinct puffball seed cluster in later growth stages. Oxalis (*Oxalidales*) can be visually distinguished by light green, clover-shaped leaves and cup-shaped yellow flowers (when present). When detected, both of these plants species (commonly regarded as "weeds") can be utilized to infer certain soil characteristics, which are discussed in detail below. Further, and as will readily be appreciated by crop growers, gardeners, botanists, and others, the classification and appearance of numerous plants types or species is well-documented and impractically lengthy to be fully listed here. Further, in instances in which it is difficult for image-based soil mapping system to identify a particular non-crop plant population with sufficient confidence, the image-based soil mapping system can request that a user (e.g., a crop producer) capture additional images of the non-crop plant population (e.g., utilizing a smartphone or tablet) or, perhaps, the soil mapping system may request that an end user (e.g., a crop producer) verify the particular non-crop plant population present at a particular location of an imaged crop field.

In certain embodiments, various techniques may further be applied to reduce processing loads and increase plant identification accuracy during STEP 60 of the example image-based soil characteristic mapping process 56. For example, as indicated in FIG. 2 by SUBSTEP 76, processing may be streamlined by identifying a geographical region in which the imaged crop field is located, such as the "southwestern region of the United States," and then limiting image analysis performed the image-based soil mapping system to non-crop vegetation categories generally found within the geographical region in which the imaged crop field is located. Similarly, seasonal data may be considered to, for example, eliminate from consideration plant species unlikely to be present at a particular time of year; or to further accommodate seasonally-based changes in appearance (e.g., flowering stages) of the candidate plant species, as applicable. As a still further possibility, if soil type is known (e.g., by user input) or can be inferred from the currently-grown crop type and geographical region (e.g., whether the soil is properly classified as clay, sandy, silty, peaty, chalky, loamy, or a combination thereof, such as sandy clay, silty clay, silty clay loam, clay loam, loamy sand, sandy loam, sandy clay loam, and so on), plant species or populations unable to grow in a particular soil type may be eliminated from consideration during visual analysis of the crop field images to identify any non-crop plant populations contained therein.

With continued reference to FIG. 2, the image-based soil mapping system next advances to STEP 62 of the soil characteristic mapping process 56 and compiles one or more soil characteristic maps based upon the non-crop vegetation distributions identified during STEP 60. The soil characteristic mapping process 56 may compile a soil characteristic map for the imaged crop field based, at least in part, upon a comparison between the non-crop vegetation distributions and reference data stored in a first database correlating different categories of non-crop vegetation with variations in one or more soil characteristics; e.g., the crop-soil indicator database 52 shown in FIG. 1. As noted above, the crop-soil indicator database 52 stores information correlating various types of non-crop vegetation or plant species with variations in soil characteristics stored as, for example, a multi-dimensional look-up table or similar data structure. The soil mapping system may utilize any non-crop vegetation distributions, as identified in the captured crop field images, to infer the soil characteristic or characteristics desirably subject to mapping; e.g., giving greater or lesser weight or probability to likely soil characteristics, as inferred from the non-crop vegetation distributions, based upon non-crop vegetation type and density. Such soil characteristics can include, but are not limited to, soil fertility levels, soil moisture levels, pH levels, chemical toxicity levels, soil nutrient levels, soil composition, and soil compaction levels. With respect to soil nutrient levels, primary macronutrients may be usefully mapped (nitrogen, phosphorus, and potassium levels) utilizing the soil characteristic mapping process 56; secondary macronutrients may be mapped (calcium, magnesium, and sulfur); and/or any consequential micronutrients may be mapped (e.g., iron, manganese, zinc, copper, boron, molybdenum, chlorine, and nickel). With respect to soil type, and as also previously noted, soil present within different regions of the mapped crop field may be classified as clay, sandy, silty, peaty, chalky, loamy, and combinations thereof. Various other soil characteristics can also be mapped in embodiments of the present disclosure, potentially including concentrations of aeration and certain microorganisms, providing that such soil characteristics or traits can be inferred (generally correlate to) the presence of certain plant populations or species recognized via visual analysis of the crop field imagery.

The non-crop vegetation distributions considered during STEP 62 of the soil characteristic mapping process 56 can and will vary between embodiments, noting again that the soil conditions under which numerous types of plants species grow are generally established and thoroughly documented. This notwithstanding, to provide a few, non-limiting examples, the presence of the following plant species may indicate high soil compaction (particularly when found in dense populations or clusters) in embodiments in which soil compaction levels are desirably mapped utilizing the soil characteristic mapping process 56: bindweed (*Convolvulus arvensis*), chickweed (*Stellaria media*), chicory (*Chicorium*), dandelion (*Taraxacum officinale*), knotweed (*Polygonum*), plantain (*Plantago*), and quackgrass (*Elymus repens*). Further, the presence of chickweed (*Convolvulus arvensis*), chicory (*Chicorium*), peppergrass (*Lepidium verginicum*), and Queen Anne's lace (*Daucus carota*) typically indicate alkaline (pH≥7.5) soil conditions; the presence of fragile fern (*Cystopteris fragilis*) indicates neutral pH levels (6.5<pH>7.5); and the presence of moss, mullein (*Verbascum thapsus*), ox-eye daises (*Leucanthemum vulgare*), pearly everlasting (*Anaphalis margaritacea*), plantain (*Plantago*), stinging nettle (*Urtica dioica*), and sheep sorrel (*Rumex acetosella*) indicates acidic (pH≤6.5) soil conditions in instances in which soil pH levels are desirably mapped. Finally, the presence of crabgrass (*Digitaria*), dandelion (*Taraxacum officinale*), ox-eye daises (*Leucanthemum vulgare*), plantain (*Plantago*), and ragweed (*Ambrosia*) may typically indicate low soil fertility levels when soil fertility levels are desirably mapped.

Continuing the description above, and further addressing soil moisture retention, the presence (and concentration or density) of mustard (*Brassica*) and sheep sorrel plants (*Rumex acetosella*) may indicate dry soil, potentially resulting from excessive drainage. Conversely, the presence of the following plants species may indicate wet or water logged soil due to, for example, poor drainage: hedge bindweed (*Convolvulus sepium*), bull sedge (*Carex lasiocarpa*), Canada goldenrod (*Solidago graminifolia*), cattail (*Typha latifolia*), coltsfoot (*Tussilago farfara*), creeping buttercup (*Ranunculus repens*), curly dock (*Rumex crispus*), ox-eye daisy (*Chrysanthemum leucanthemum*), foxtail (*Hordeum jubatum*), goldenrods (*Solidago*), groundnut (*Apios americana*), poison hemlock (*Conium maculatum*), horsetail (*Equisetum arvense*), jewelweed (*Impatiens pallida*), joe-pye weed (*Eupatorium purpereum*), lady's thumb (*Polygonum persicaria*), marsh mallow (*Althaea officinalis*), May apple (*Podophyllum peltatum*), meadow pink (*Lychnis floscuculi*), meadow sweet (*Astilbe*), moss, stinging nettles (*Urtica urens*), Pennsylvania smartweed (*Polygonum pensylvanicum*), tansy (*Senecio jacobaea*), sheep sorrel (*Rumex acetosella*), silvery cinquefoil (*Potentilla argentea*), sweet flag (*Acorus calamus*), tall buttercup (*Ranuculus acris*), thyme-leafed speedwell (*Veronica serpyllifolia*), and black willow (*Salix*).

Addressing next primary macronutrients affecting plant growth, the presence of chickweed (*Stellaria media*), chicory (*Chicorium*), common groundsel (*Senecio vulgaris*), henbit (*Lamium amplexicaule*), Lambsquarters (*Chenopodium album*), and amaranth (*Amaranthus*) may indicate high nitrogen (N) levels, while sheep sorrel (*Rumex acetosella*) may indicate low N levels in embodiments in which soil N levels are desirably subject to mapping via the image-based soil characteristic mapping process 56. The presence of mustard (*Brassica*) and purslane (*Portulaca oleracea*) typically indicate high phosphorus (P) levels in embodiments in which soil P levels are desirably mapped. The presence of dandelion (*Taraxacum officinale*) and knapweed (*Centaurea*) may indicate high potassium (K) levels, while the presence of yarrow (*Achillea millefolium*) indicates low potassium (K) levels in embodiments in which soil K levels are desirably mapped. Finally, addressing the secondary macronutrients, the presence of annual bluegrass (*Poa annua*), crabgrass (*Digitaria*), dandelion (*Taraxacum officinale*), chives (*Allium schoenoprasum*), oxalis (*Oxalidales*), and sheep sorrel (*Rumex acetosella*) may indicate low calcium (Ca) levels in embodiments in which soil Ca levels are desirably mapped. The presence of oxalis (*Oxalidales*) and annual bluegrass (*Poa annua*) may indicate high magnesium (Mg) levels in embodiments in which soil Mg levels are desirably mapped.

Next, at STEP 64 of the imaged-based soil characteristic mapping process 56, the image-based soil mapping system determines whether additional data is available to refine the soil characteristic map generated at STEP 62. Such additional data may include, for example, historical information regarding previous soil characteristic maps or physical soil samples can also be considered and blended with the above-described image-based soil trait analysis to further refine the newly-generated soil characteristic map or maps, as desired. User input (e.g., entered via the personal display device 12 and transmitted over the network 18 to the SMS server end 14) describing aspects of the desirably grown crops, soil type, soil treatment procedures, soil tillage practices, currently-installed tilling, recent observations pertaining to problematic non-crop plant species, and other such information may also be considered by the SMS server end 14 in constructing or refining the soil characteristic map. So too may information pertaining to other adjoining or neighboring crop fields be considered (e.g., nearby fields already subject to image-based soil characteristics mapping) in constructing or refining the soil characteristic map in embodiments. Finally, in instances in which a given crop field is imaged on an iterative basis over a period of time, changes in the appearance of crop plants (e.g., population increases or decreases, yellowing or other color changes of leaves, and other such gradual variations) may be considered in constructing or refining the soil characteristic map, as may be particularly beneficial in addressing nutrient (e.g., magnesium) deficiencies and other soil imbalances.

At STEP 68 of the soil characteristic mapping process 56, the image-based soil mapping system provides or avails the soil characteristic map for user viewing on a display device. Two examples of soil characteristic maps 78, 82 generated on display devices 80, 84, respectively, are shown in FIG. 2: a first soil characteristic map 78 generated on a monitor 80 of the type commonly mounted in the cabin of a tractor, a combine, a windrower, or other agricultural work vehicle; and a second soil characteristic map 82 generated on a personal display device 84 in the form of a smartphone, with the map 82 equally viewable on a range of other display devices, including tablets and personal computers. Generally, the soil characteristic maps 78, 82 can assume any form suitable for visually conveying the desired information and can be presented on any suitable display device. Commonly, and as indicated in FIG. 2, such soil characteristic maps 78, 82 are color coded, with different colors or color shading indicating varying magnitudes of the mapped soil characteristic. In certain cases, a given soil characteristic map can be blended or superimposed over aerial or satellite imagery of an imaged crop field and the surrounding area. Generally, then, the appearance of a given soil characteristic map can vary among embodiments, providing the soil characteristic map visually conveys variations in at least one soil characteristic or trait across at least a portion of a crop field subject mapping. Following STEP 68 of the soil characteristic mapping process 56, the image-based soil mapping system progresses to STEP 70 and determines whether soil treatment recommendations are also desirably provided to the user in conjunction with the soil characteristic map. If so, the image-based soil mapping system progresses to STEP 74 and executes a subprocess for ascertaining soil treatment recommendations utilizing the newly-generated soil characteristic map or maps and other data inputs. An example of such a subprocess is further discussed below in connection with FIG. 3. Otherwise, if determining that soil treatment recommendations are not desirably provided during STEP 70, the image-based soil mapping system progresses to STEP 72 and the current iteration of the image-based soil characteristic mapping process 56 terminates.

Figure 3:
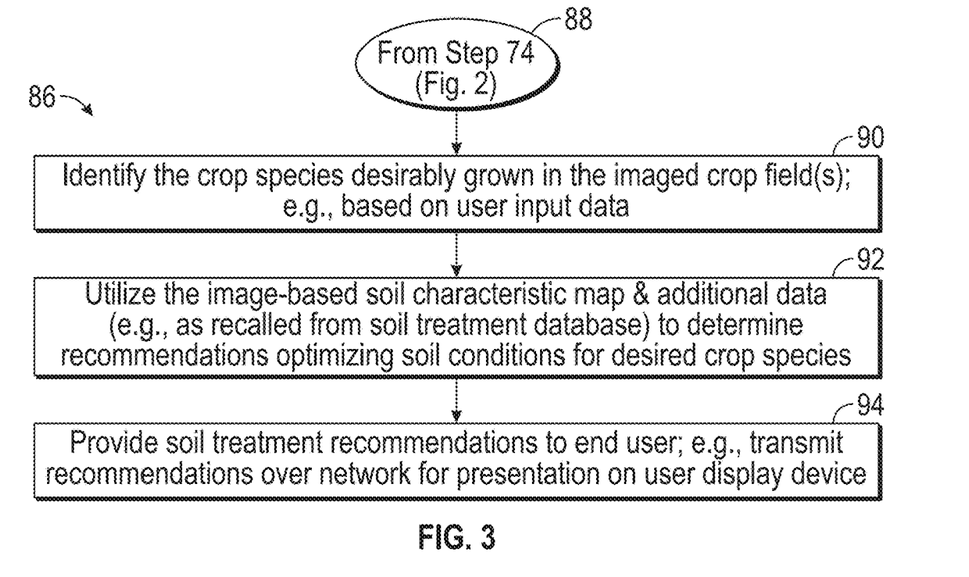
FIG. 3 is a flowchart of an example subprocess for generating soil treatment recommendations, which may be performed in conjunction with the example soil characteristic mapping process of FIG. 2 in embodiments of the present disclosure.

Referring to FIG. 3, an example subprocess 86 for generating soil treatment recommendations is presented. The soil treatment recommendation subprocess 86 may be performed in conjunction with the above-discussed example soil characteristic mapping process (FIG. 2) in embodiments, as indicated at STEP 88. When performing the soil treatment recommendation subprocess 86, the image-based soil mapping system may initially identify the crop species desirably grown in the recently-imaged crop fields (STEP 90). The image-based soil mapping system conveniently identifies the desired crop species based upon user input. For example, in embodiments in which the imaged-based soil mapping system is implemented at the SMS server end 14 shown in FIG. 1, a user (e.g., a crop producer) may interact with the personal display device 12 or another network-connected computing device to enter user data identifying the crop species desirably grown in the relevant crop field or fields. In one approach, the user may interact with a specialized software program (e.g., the application 28) executing on the OS 26 to select the desired crop species from, for example, a drop down list. The personal display device 12 may then transmit this data to the SMS server end 14 over the network for consideration in carrying-out the subprocess 86. In other instances, a user may utilize the display device 12 or an analogous computing device to navigate to a webpage and enter similar information, which is then conveyed to the SMS server end 14; or a user may call a service and verbally communicate the relevant information. In still other instances, the SMS server end 14 may identify the desired crop species by visual analysis of the crop field images, based upon a pre-established user profile, or in another manner.

After identifying the desired crop species, the soil characteristic mapping system progresses to STEP 92 of the soil treatment recommendation subprocess 86. During this step, the soil characteristic mapping system utilizes the image-based soil characteristic map and data recalled from the above-noted soil treatment database 50 to determine soil treatment recommendations to optimize the soil conditions for growth of the desired crop species. If, for example, the desirably-grown plant species thrives in soil possessing a neutral pH (7.5<pH≥6.5), and the newly-generated soil characteristic map indicates that certain field regions principally contain undesirably alkaline or "sweet" soil (pH≥7.5), or if soil characteristic map indicates that certain field regions contain acidic or "sour" soil (pH<7.5), the soil characteristic mapping system may provide targeted recommendations for neutralizing the soil pH in the problematic field regions; e.g., through the strategic addition of soil organic matter or another additive buffering soil pH. A similar approach can be utilized to address low fertility or a nutrient deficiency (e.g., a deficiency of N, Ca, or K) by, for example, recommending localized or targeted soil amendments (or, perhaps, global soil amendments if appropriate). Such recommendations may be site specific (e.g., expressed as color coded regions of a georeferenced map or in another manner) and may vary in magnitude based upon the estimated disparity between the optimum soil conditions and those indicated by the soil characteristic map. Other recommendations may include tillage suggestions to improve aeration and reduce top soil density; and/or tilling modification recommendations to alter the moisture retention of the crop field, such as the installation of new tiling to reduce moisture retention when appropriate.

Lastly, at STEP 94 of the soil treatment recommendation subprocess 86, the image-based soil mapping system provides the soil treatment recommendations to the user, client, or crop producer. Locally-targeted soil treatment recommendations may be presented in a map format similar to the above-described soil characteristic maps, with certain color-coded or otherwise visually-distinct regions of the map denoting areas to which specific soil treatment recommendations pertain, such as the application of soil amendments, drainage improvements, or tillage suggestions, as previously discussed. Beneficially, given the relatively low cost, streamlined manner in which imaged-based soil characteristic maps can be constructed utilizing the processes described herein, additional soil characteristic maps can be compiled or generated at desired time intervals following the implementation of such soil treatment recommendations to evaluate the efficacy of such recommendations and to further refine additional soil treatment recommendations to optimize effectiveness. Through such an iterative process and targeted, precision agricultural soil treatments, the soil conditions of a particular crop field can be cultured to optimize growth and yield of the desirably-grown crop species.

Figure 4:
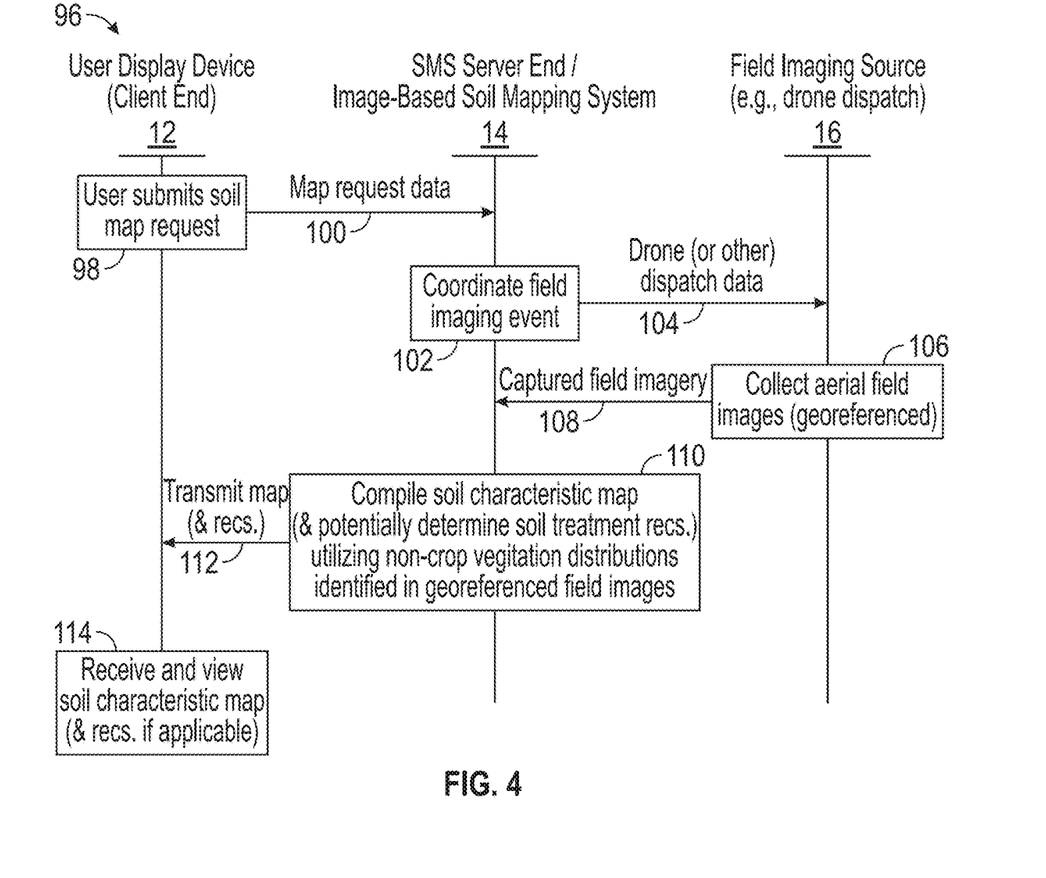
FIG. 4 is a signal timing diagram illustrating different functions and transmissions potentially carried-out by a personal display device (client device), a field imaging source, and an image-based soil mapping system (e.g., the server end shown in FIG. 1) in an example embodiment.

Turning next to FIG. 4, there is shown a signal timing diagram 96 illustrating different actions and transmissions suitably carried-out when performing embodiments of the image-based soil characteristic mapping process 56 (FIG. 2) and, perhaps, when performing embodiments of the soil treatment recommendation subprocess 86 (FIG. 3). Carrying reference numerals forward where appropriate, the signal timing diagram 96 sets-out potential actions performed by the user display device 12, an image-based soil mapping system (again, SMS server end 14 in this example), and the field imaging source 16. To initiate the process flow outlined by the signal timing diagram 96, a user interacts with the user display device 12 to submit a soil map request (FUNCTION 98) specifying the location of the crop field or fields desirably subject to mapping, as well as to provide other relevant data. Accordingly, a signal is transmitted from the user display device 12, over the network 18 (FIG. 1), and to the SMS server end 14 (TRANSMISSION 100). In response to receipt of the map request data, the SMS server end 14 then coordinates a field imaging event (FUNCTION 102) by scheduling the event and requesting the appropriate number and type of field imagining devices. The appropriate data is then provided to the field imaging source (TRANSMISSION 104), which duly collects aerial field images in this example (FUNCTION 106), again noting that other types of field imaging sources can be employed to gather the crop field imagery in further implementations. In one approach, one or more camera-equipped drones (perhaps, a small fleet of drones for larger agricultural areas) are dispatched to the relevant agricultural area to collect the desired field imagery in a systemic manner, potentially providing a livestream of the video images to the SMS server end 14 for immediate analysis in generating the desired soil characteristic maps.

The georeferenced aerial field images are then provided by the field imaging source 16 to the SMS server end 14 (TRANSMISSION 108), which then generates one or more soil characteristic maps utilizing the captured field imagery (FUNCTION 110). In particular, and as described above in connection with STEPS 60, 62, 64, 66 of the image-based soil characteristic mapping process 56 (FIG. 2), the SMS server end 14 (here, functioning as the image-based soil mapping system) visually analyzes the georeferenced field images to identify and categorize non-crop vegetation distributions present within the imaged crop field; and compiles a soil characteristic map for the imaged crop field based, at least in part, on a comparison between the non-crop vegetation distributions and data stored in a first database correlating different categories of non-crop vegetation with variations in one or more soil characteristics. The SMS server end 14 may also generate appropriate soil treatment recommendations, if so requested, at FUNCTION 110 of the signal timing diagram 96. The SMS server end 14 then transmits the newly-generated soil characteristic map and any accompanying soil treatment recommendations over the network 18 and to the user display device 12 (TRANSMISSION 112). Lastly, at FUNCTION 114, a user (e.g., a crop producer) may then interact with the user display device 12 to view or other consider the newly-generated soil characteristic maps and the soil treatment recommendations, as appropriate.

Figure 6:
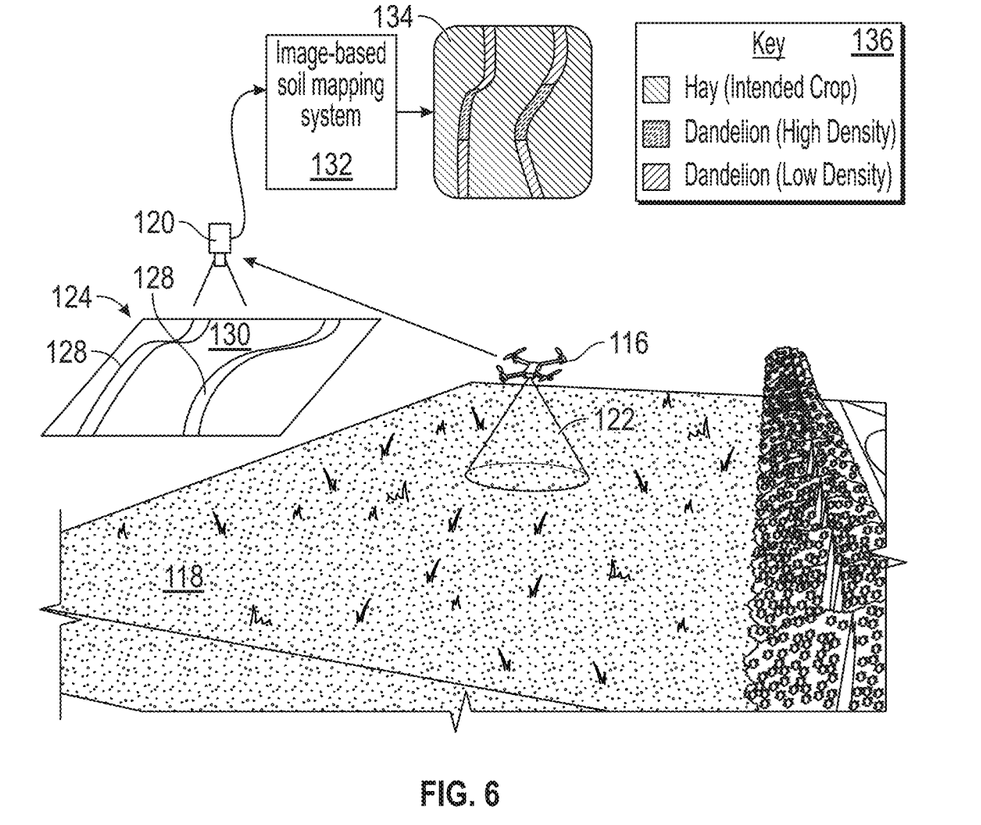
FIG. 6 illustrates one manner in which a camera-equipped drone can be utilized to capturing visual imagery of a crop field (a small portion of which is shown in perspective), with the crop field imagery utilized in carrying-out an example implementation of the image-based soil characteristic mapping process set-forth in FIG. 2 (several steps of which are schematically represented in FIG. 6).

As discussed above, one or more rotary wing drones (e.g., quadcopter drones or other rotorcraft) may be dispatched to an agricultural area to fly designated patterns (e.g., a sweeping pattern) over the crop field, thereby effectively scanning the desired area in a comprehensive manner in embodiments of the image-based soil characteristic mapping process. Consider, in this regard, FIGS. 5 and 6 jointly illustrating one manner in which at least one camera-equipped drone 116 may be flown over a crop field 118 to capture imagery of the crop field for soil mapping purposes. The camera onboard the drone 116 is generically represented by a camera symbol 120 shown on the left of FIG. 5, while the camera FOV is represented by a graphic 122. A single georeferenced field image (e.g., a still image or a frame extracted from a video) is further represented in FIG. 6 by a graphic 124 and generally corresponds with the line drawing 126 (converted from a crop field photograph) shown in perspective in FIG. 5. Here, two compaction zones 128 are distinguishable from the surrounding region 130 of the imaged field, largely due to the presence of non-crop plant populations (here, dandelion distributions) within the crop field image. The drone-mounted camera 120 thus captures the georeferenced field image 124 and provides the georeferenced field image 124 to an image-based soil mapping system 132 (e.g., the SMS server end 14 shown in FIG. 1) for analysis. The image-based soil mapping system 132 then visually analyzes the received georeferenced field image to identify and categorize any non-crop vegetation distributions contained therein. In the present example, and as indicated in FIG. 6 by the graphic 134 and a key 136, the image-based soil mapping system 132 identifies different concentrations of the non-crop (e.g., dandelion) distributions in the compaction zones 128 and renders different soil compaction estimates based upon the presence and respective densities of the dandelion populations when constructing one or more soil characteristic maps in the manner previously described above in connection with FIGS. 1-4.

Enumerated Examples of Methods for Generating Image-Based Soil Characteristic Maps The following examples of methods for compiling image-based soil characteristic maps are further provided and numbered for ease of reference.

1. In embodiments, a soil mapping process includes the step or process of receiving georeferenced field images of vegetation within an imaged crop field, with the georeferenced field images transmitted from a field imaging source to an image-based soil mapping system. The image-based soil mapping system visually analyzes the georeferenced field images to identify and categorize non-crop vegetation distributions present within the imaged crop field; compiles a soil characteristic map for the imaged crop field based, at least in part, on a comparison between the non-crop vegetation distributions and data stored in a first database correlating different categories of non-crop vegetation with variations in one or more soil characteristics; and then provides the soil characteristic map for user viewing on a display device.

2. The soil mapping process of example 1, wherein one or more desired forage crops are desirably grown in the imaged crop field. Further, the step of analyzing entails identifying and categorizing geographical distributions of any plants present within the imaged crop field other than the one or more desired forage crops.

3. The soil mapping process of example 2, further including the step of identifying, at the image-based soil mapping system, the one or more desired forage crops based upon user input received at an interface of the image-based soil mapping system.

4. The soil mapping process of example 2, further including the step of: (i) recalling, from memory, a second database correlating optimal soil characteristics with different categories of forage crops; (ii) determining, via the image-based soil mapping system, localized soil modification recommendations for maximizing production of the one or more desired forage crops based, at least in part, on a comparison between the soil characteristic map and the data stored in the second database; and (iii) enabling, via the image-based soil mapping system, the localized soil modification recommendations for user viewing on the display device.

5. The soil mapping process of example 4, wherein the localized soil modification recommendations include at least one of (i) soil amendment recommendations, (ii) tillage recommendations, and (iii) drainage recommendations.

6. The soil mapping process of example 1, further including the steps of: (i) identifying, via the image-based soil mapping system, a geographical region in which the imaged crop field is located; and (ii) when identifying and categorizing non-crop vegetation distributions present within the imaged crop field, limiting image analysis performed utilizing the image-based soil mapping system to non-crop vegetation categories generally found within the geographical region in which the imaged crop field is located.

7. The soil mapping process of example 1, wherein the step of receiving entails receiving the field images as aerial images captured by at least one aircraft or satellite at an elevation above the imaged crop field.

8. The soil mapping process of example 7, wherein the step of receiving entails receiving the field images as aerial images captured by at least one drone as the drone flies a sweeping pattern over the imaged crop field.

9. The soil mapping process of example 1, wherein the step of receiving entails includes receiving the field images from at least one camera onboard an agricultural vehicle when traveling through the imaged crop field.

10. The soil mapping process of example 1, wherein the step of receiving entails includes receiving the field images from a fixed-position camera mounted to an object located in or adjacent the imaged crop field and positioned to capture an elevated view thereof.

11. The soil mapping process of example 1, wherein the step of compiling entails generating the soil characteristic map to indicate variations in at least one of soil fertility levels and soil pH levels across the imaged crop field based, at least in part, on the non-crop vegetation distributions as compared to data stored in the first database.

12. The soil mapping process of example 1, wherein the step of compiling entails generating the soil characteristic map to indicate variations in soil moisture levels across the imaged crop field, at least in part, on the non-crop vegetation distributions as compared to data stored in the first database.

13. The soil mapping process of example 1, wherein the step of compiling entails generating the soil characteristic map to express soil composition information across the imaged crop field based, at least in part, on the non-crop vegetation distributions as compared to data stored in the first database.

14. The soil mapping process of example 13, further including the steps of assigning different regions of the imaged crop field to a soil category based, at least in part, on the non-crop vegetation distributions as compared to data stored in the first database. Further, the step of generating entails generating the soil characteristic map to express the soil category assigned to the different regions of the imaged crop field.

15. The soil mapping process of example 1, wherein the step of compiling entails generating the soil characteristic map to indicate variations in chemical toxicity levels based, at least in part, on the non-crop vegetation distributions as compared to data stored in the first database.

CONCLUSION

There has thus been provided systems and methods for generating soil characteristic maps based at least in part upon non-crop vegetation distributions or plant populations identified through visual analysis of crop field imagery. Advantageously, embodiments of the image-based soil characteristic mapping process are capable of generating soil characteristic maps at significantly reduced costs and in abbreviated time periods relative to existing methods for constructing soil characteristic maps through the physical collection and lab or on-site analysis of soil samples. Further, data regarding soil characteristic inferred from the non-crop vegetation distribution identified in crop field imagery can be combined with other data items, such as historical soil sample data or previously-gathered physical soil samples, to enhance accuracy of the resultant soil characteristic map in embodiments. Further, the relative ease and rapidity by which such image-based soil characteristic maps can be generated enables mapping activities to be conducted on a relatively frequent basis, as desired, to enhance timeliness. The construction or generation of soil characteristic maps may be carried-out utilizing various different of image-based soil mapping systems, such as a soil mapping system implemented locally via personal computing devices (e.g., smartphones, tablets, personal computers, or the like) executing software programs supporting the generation of such maps. Alternatively, embodiments of the image-based soil mapping system may be implemented at a server end or side and availed as part of a larger service for generating such image-based soil maps, with the service also potentially deploying drones or other such camera-equipped devices to crop fields to collect georeferenced field images of vegetation upon crop producer request.

Finally, as used herein, the singular forms "a", "an," and "the" are desired to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not desired to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A soil mapping process carried-out utilizing an image-based soil mapping system, the method comprising:
   receiving georeferenced field images of vegetation within an imaged crop field, the georeferenced field images transmitted from a field imaging source to the image-based soil mapping system;
   visually analyzing, via the image-based soil mapping system, the georeferenced field images to identify and categorize non-crop vegetation distributions present within the imaged crop field;
   compiling, at the image-based soil mapping system, a soil characteristic map for the imaged crop field based, at least in part, on a comparison between the non-crop vegetation distributions and data stored in a first database correlating different categories of non-crop vegetation with variations in one or more soil characteristics;
   providing, via the image-based soil mapping system, the soil characteristic map for user viewing on a display device;
   recalling, from memory, a second database correlating optimal soil characteristics with different categories of forage crops;
   determining, via the image-based soil mapping system, localized soil modification recommendations for maximizing production of one or more desired forage crops based, at least in part, on a comparison between the soil characteristic map and the data stored in the second database; and
   enabling, via the image-based soil mapping system, the localized soil modification recommendations for user viewing on the display device.

2. The soil mapping process of claim 1, wherein analyzing comprises identifying and categorizing geographical distributions of any plants present within the imaged crop field other than the one or more desired forage crops.

3. The soil mapping process of claim 2, further comprising identifying, at the image-based soil mapping system, the one or more desired forage crops based upon user input received at an interface of the image-based soil mapping system.

4. The soil mapping process of claim 1, wherein the localized soil modification recommendations comprise at least one of (i) soil amendment recommendations, (ii) tillage recommendations, and (iii) drainage recommendations.

5. The soil mapping process of claim 1, further comprising:
identifying, via the image-based soil mapping system, a geographical region in which the imaged crop field is located; and
when identifying and categorizing non-crop vegetation distributions present within the imaged crop field, limiting image analysis performed utilizing the image-based soil mapping system to non-crop vegetation categories generally found within the geographical region in which the imaged crop field is located.

6. The soil mapping process of claim 1, wherein receiving comprises receiving the field images as aerial images captured by at least one aircraft or satellite at an elevation above the imaged crop field.

7. The soil mapping process of claim 6, wherein receiving comprises receiving the field images as aerial images captured by at least one drone as the drone flies a sweeping pattern over the imaged crop field.

8. The soil mapping process of claim 1, wherein receiving comprises receiving the field images from at least one camera onboard an agricultural vehicle when traveling through the imaged crop field.

9. The soil mapping process of claim 1, wherein receiving comprises receiving the field images from a fixed-position camera mounted to an object located in or adjacent the imaged crop field and positioned to capture an elevated view thereof.

10. The soil mapping process of claim 1, wherein compiling comprises generating the soil characteristic map to indicate variations in at least one of soil fertility levels and soil pH levels across the imaged crop field based, at least in part, on the non-crop vegetation distributions as compared to data stored in the first database.

11. The soil mapping process of claim 1, wherein compiling comprises generating the soil characteristic map to indicate variations in soil moisture levels across the imaged crop field, at least in part, on the non-crop vegetation distributions as compared to data stored in the first database.

12. The soil mapping process of claim 1, wherein compiling comprises generating the soil characteristic map to express soil composition information across the imaged crop field based, at least in part, on the non-crop vegetation distributions as compared to data stored in the first database.

13. The soil mapping process of claim 12, further comprising assigning different regions of the imaged crop field to a soil category based, at least in part, on the non-crop vegetation distributions as compared to data stored in the first database; and
wherein generating comprises generating the soil characteristic map to express the soil category assigned to the different regions of the imaged crop field.

14. The soil mapping process of claim 1, wherein compiling comprises generating the soil characteristic map to indicate variations in chemical toxicity levels based, at least in part, on the non-crop vegetation distributions as compared to data stored in the first database.

15. The soil mapping process of claim 1, wherein compiling comprises generating the soil characteristic map to indicate variations in soil nutrient levels across the imaged crop field based, at least in part, on the non-crop vegetation distributions as compared to data stored in the first database.

16. The soil mapping process of claim 1, wherein compiling comprises generating the soil characteristic map to indicate variations in soil compaction levels across the imaged crop field based, at least in part, on the non-crop vegetation distributions as compared to data stored in the first database.

17. An image-based soil mapping system, comprising:
an input/output (I/O) interface;
a memory containing a first database in which data is stored correlating different categories of non-crop vegetation with variations in one or more soil characteristics and a second database in which data is stored correlating optimal soil characteristics with different categories of forage crops; and
a processor architecture coupled to the I/O interface and to the memory, the processor architecture configured to:
receive georeferenced field images of vegetation within an imaged crop field, the georeferenced field images transmitted from a field imaging source to the controller architecture via the I/O interface;
visually analyze the georeferenced field images to identify and categorize non-crop vegetation distributions present within the imaged crop field;
compile a soil characteristic map for the imaged crop field based, at least in part, on a comparison between the non-crop vegetation distributions and data stored in the first database correlating different categories of non-crop vegetation with variations in one or more soil characteristics;
determine localized soil modification recommendations for maximizing production of one or more desired forage crops based, at least in part, on a comparison between the soil characteristic map and the data stored in the second database; and
enable the localized soil modification recommendations for user viewing on the display device.

18. The image-based soil mapping system of claim 17, wherein the display device is operated by a crop producer;
wherein the processor architecture communicates with the display device over a network; and
wherein the processor architecture is configured to enable user viewing of the soil characteristic map by transmitting the soil characteristic map from the processor architecture, over the network, and to the display device for viewing by the crop producer.

19. The image-based soil mapping system of claim 17, wherein the processor architecture is further configured to:
determine, based upon user input, the one or more desired forage crops are desirably grown in the imaged crop field; and
identify and categorize geographical distributions of any plants present within the imaged crop field other than the one or more desired forage crops.

\* \* \* \* \*